Nov. 17, 1931. E. WILSON Re. 18,251

FLUID COMPRESSOR

Original Filed May 7, 1918 5 Sheets-Sheet 1

INVENTOR
EDWARD WILSON
BY Rippey & Kingsland
HIS ATTORNEYS.

Nov. 17, 1931. E. WILSON Re. 18,251

FLUID COMPRESSOR

Original Filed May 7. 1918 5 Sheets-Sheet 2

INVENTOR
EDWARD WILSON
BY Kippey & Kingsland
HIS ATTORNEYS.

Nov. 17, 1931. E. WILSON Re. 18,251

FLUID COMPRESSOR

Original Filed May 7, 1918 5 Sheets-Sheet 3

INVENTOR
EDWARD WILSON
BY Rippey & Stingsland
HIS ATTORNEYS.

Nov. 17, 1931. E. WILSON Re. 18,251
FLUID COMPRESSOR
Original Filed May 7. 1918 5 Sheets-Sheet 4
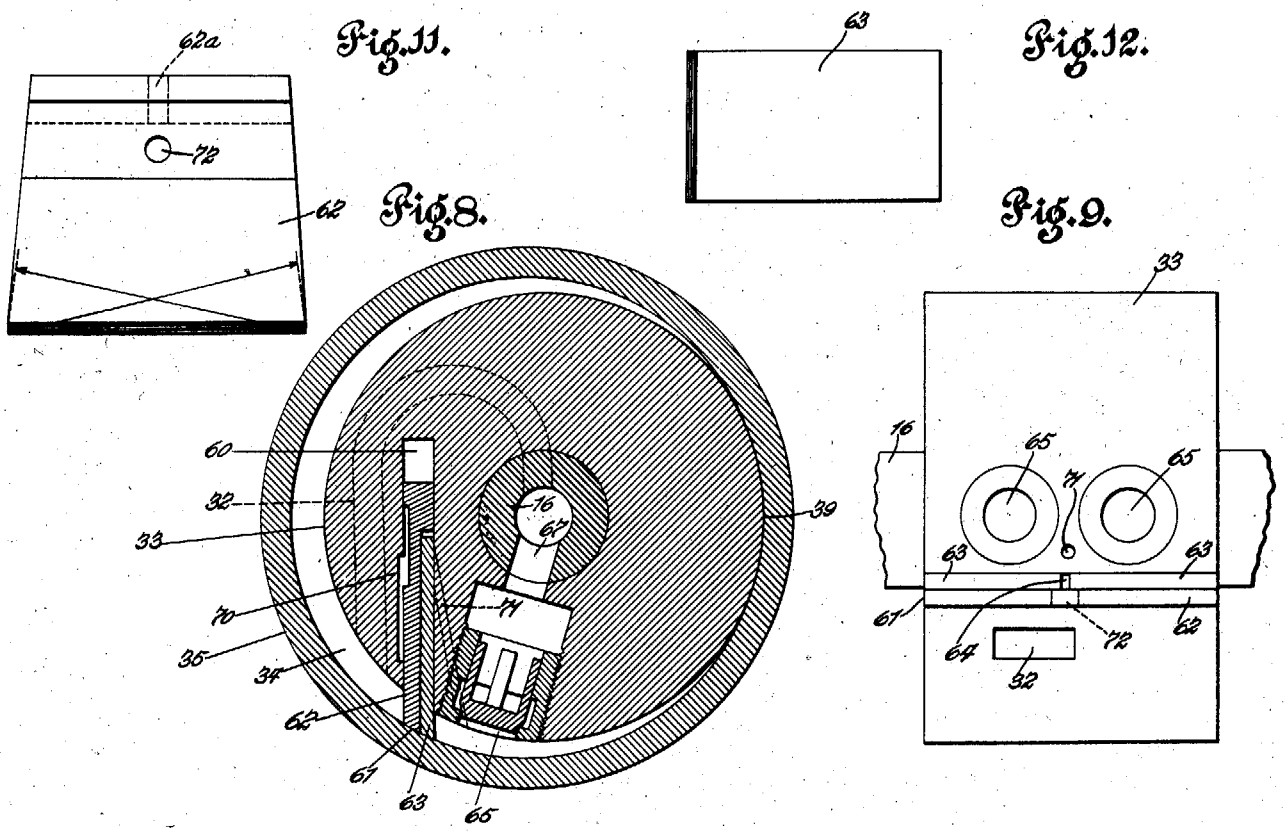
INVENTOR
EDWARD WILSON
BY Rippey & Kingsland
HIS ATTORNEYS.

Nov. 17, 1931. E. WILSON Re. 18,251

FLUID COMPRESSOR

Original Filed May 7. 1918 5 Sheets-Sheet 5

INVENTOR
EDWARD WILSON
BY Rippey & Kingsland
HIS ATTORNEYS.

Reissued Nov. 17, 1931

Re. 18,251

UNITED STATES PATENT OFFICE

EDWARD WILSON, OF ST. LOUIS, MISSOURI

FLUID COMPRESSOR

Original No. 1,635,522, dated July 12, 1927, Serial No. 233,040, filed May 7, 1918. Application for reissue filed September 25, 1930. Serial No. 484,459.

This invention relates to air compressors, blowers, pumps and the like, and has for its object, first, to produce a rotary compressor with automatic means to compensate for wear of the moving surfaces of the compression cylinder, and to prevent leakage into the compression space. Second, to reduce friction and wear of the moving parts to a minimum. Third, to provide thorough lubrication of the moving surfaces. Fourth, to minimize the heating effect of compression upon the walls of the compressor cylinder by drawing the supply of fluid through a section of the hollow shaft into the compression space and discharging the fluid after compression through another section of the hollow shaft into a cooler, and causing it to pass through the housing surrounding the cylinder on its course to a storage tank. Fifth, to produce a rotary compressor of few parts, simple in construction and easily assembled. Sixth, to produce a rotary compressor from which the fluid is discharged with uniform flow and without pulsation. Seventh, to produce a rotary compressor having a housing arranged to contain oil and to function as an oil reservoir and to hold fluid under pressure, and including means to utilize the oil to lubricate parts of the compressor and to seal the compressor to prevent leakage of the fluid under pressure into the compressor.

In the drawings—

Fig. 8 is an enlarged section of rotor and cylinder taken on line 8—8 of Fig. 1.

Fig. 9 is a side view of rotor showing relative position of ports in rotor and the rotor piston.

Fig. 11 is a detail view of a portion of the rotor piston.

Fig. 12 is a detail view of another portion of the rotor piston.

Figure 10:
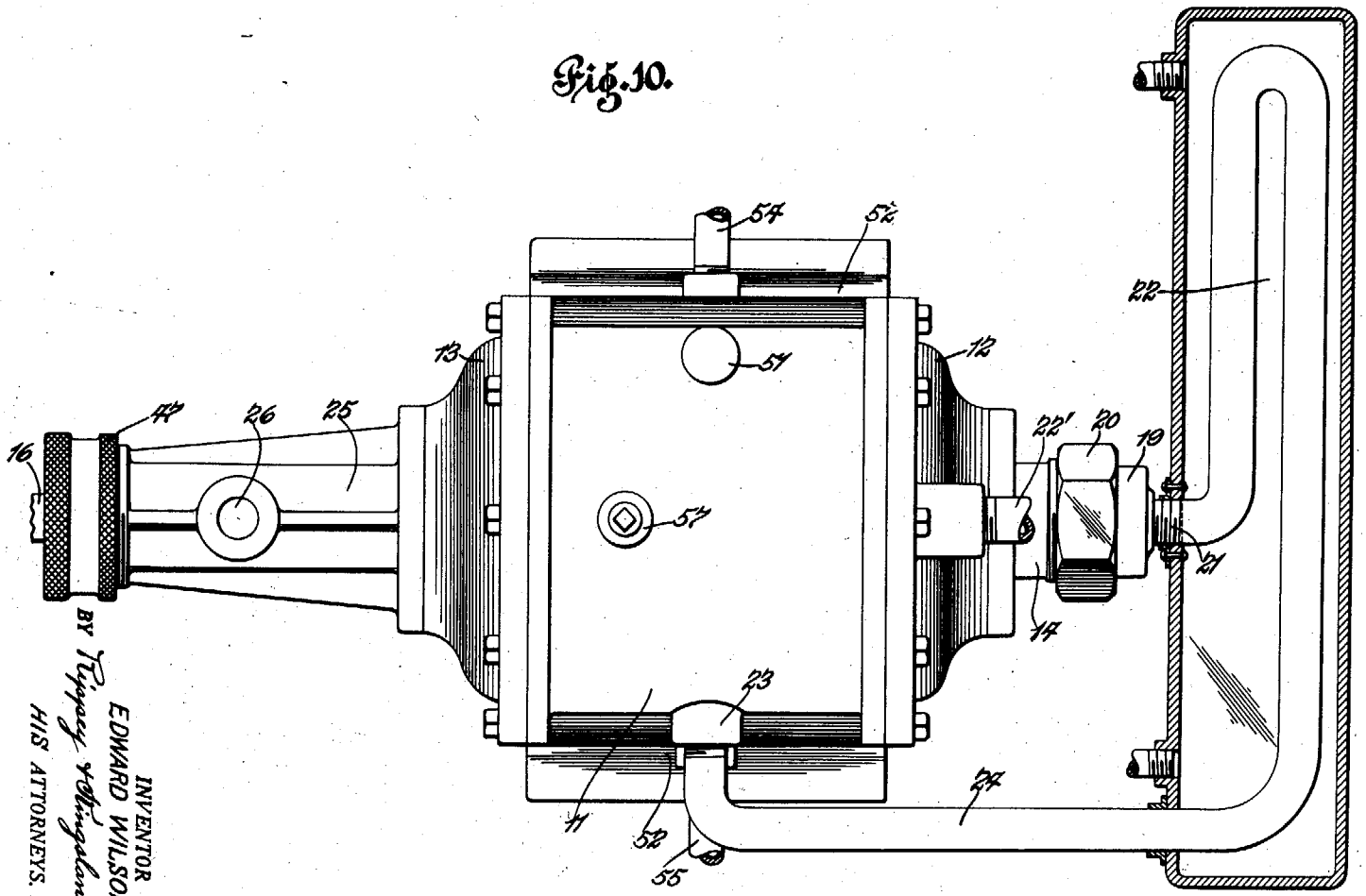
Fig. 10 is a top plan view of my invention, more specifically bringing out the construction by means of which the heat of compression around the compression cylinder is eliminated.

Referring to the drawings, 11 indicates a housing, to which is attached heads 12 and 13. Attached to head 12 is a packing box 14, within which is a packing 15, surrounding the discharge end of shaft 16. Packing 15 is adjusted by spring actuated gland 17 and spring 18, which is compressed by means of cap 19 and nut 20, which is screwed on to packing box 14. Cap 19 has a discharge pipe connection 21 leading to any suitable cooling coil or device 22. (See Fig. 10.) On head 12 is a pipe connection 22′, which leads to any suitable storage tank or reservoir for the compressed fluid.

On housing 11 is a boss 23, to which is attached the pipe 24 returning from the cooler. (See Fig. 10.) To the head 13 is attached an elongated packing box 25, which is provided with an intake pipe 26 communicating with its interior directly below the intake pipe, and within the bore of the packing box 25 is placed a split spring control gland 27, which is forced apart by means of the coil spring 28. This gland is provided with openings 29, which allow the air to enter bore 30 of shaft 16 through openings 31. The air thus admitted, passes into the opening 32 formed in the rotor 33, and thence into the compression chamber 34. This compression chamber 34 is formed between the rotary cylinder 35, rotor 33 and the floating heads 36, the rotary cylinder being mounted in member 37 on ball bearings 38 in an eccentric relation to rotor 33 and in contact therewith at point 39. Eccentric member 37 supporting cylinder 35 is likewise mounted in bearings D of housing 11 in an eccentric relation to cylinder 35. This eccentric shape of member 37 is for the purpose of maintaining a contact at point 39 between rotor 33 and cylinder 35, due to the turning effort of spring 40.

The shaft 16 is mounted concentric with the housing 11 in ball bearings 41 located in the heads 12 and 13. On the end of the shaft 16, I provide a coupling 42, which is connected to its companion coupling 43, which coupling member is mounted preferably direct to a motor shaft 44.

The packing box 25 is provided with packing 45 and 46, which is placed on each side of the slit gland 27, and is tightened or made leak proof by means of the nut 47 and the sliding compression gland 48, and normally by the action of spring 28, at the same time allowing the air to enter the bore 30 of shaft 16.

On each end of the rotor 33, I provide the spring actuated members or floating heads 36 provided with elastic packing rings 36ª. These members or floating heads 36, at the beginning of the operation of the compressor, are lightly held in contact with the ends of the rotor by means of the coil springs 49. As the operation continues, and the compressed air reaches the casing or housing 11, the fluid pressure accumulated within said casing or housing 11 exerts sufficient pressure, without the springs, to maintain a fluid tight contact with the ends of the rotor. In other words, after the compressor has been running, there will be sufficient fluid pressure in the casing or housing 11 to maintain the floating heads in fluid tight contact with the ends of the rotor, without the action of the springs. These springs, however, in so far as they perform a necessary function, are one of the features of my improvement.

The fluid tight contact between the rotor 33 and the compression cylinder 35 at point 39 is maintained by means of the coil spring 40 acting to rotate eccentric member or casing 37. The pressure of spring 40 is regulated by means of the adjusting screw 50, which is locked by means of the cap 51.

The housing 11 is provided with an integral base section 52, the bottom of which is closed by the base plate 53, and the section 52 is further supplied with pipes 54 and 55 when it is desired to water cool the housing 11.

Figure 1:
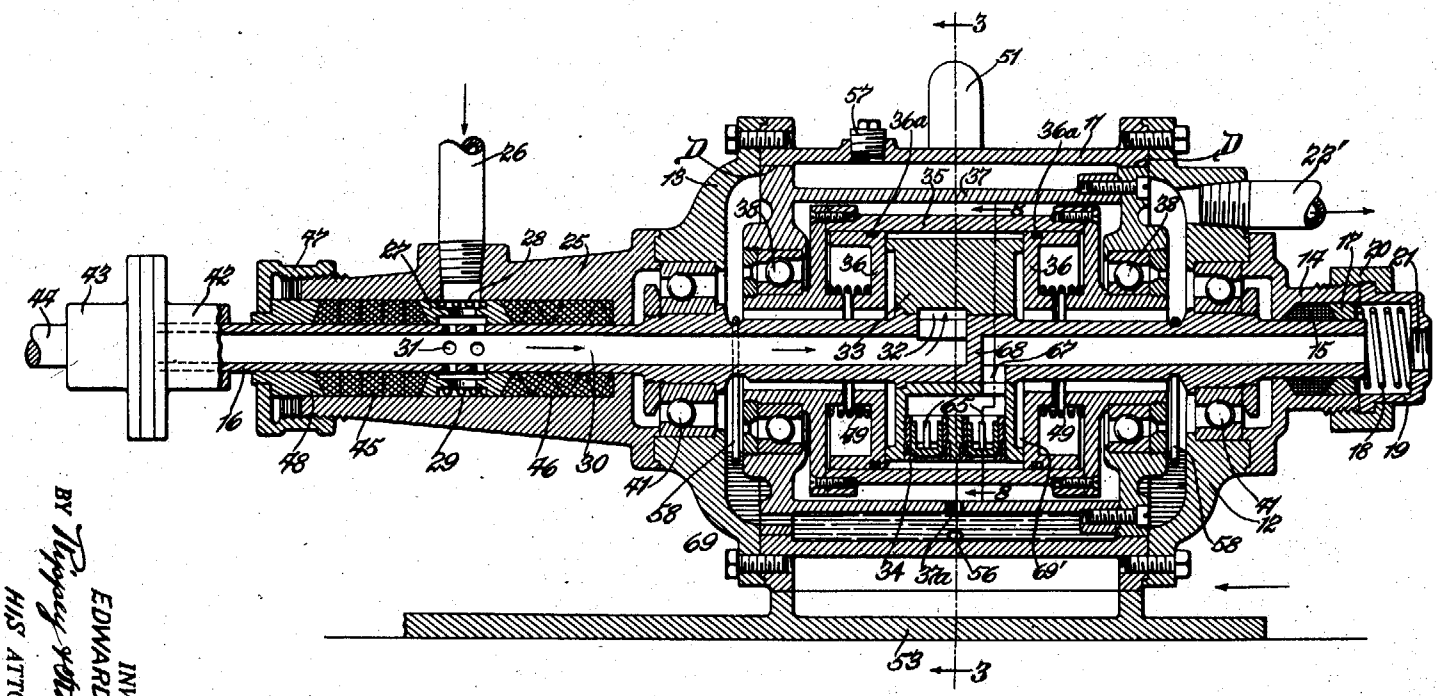
Fig. 1 is a longitudinal sectional view of my device.
Figure 2:
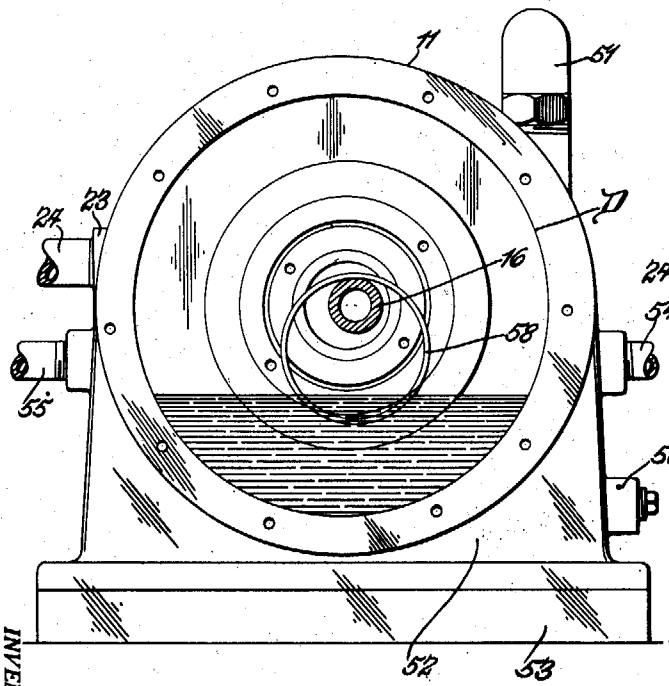
Fig. 2 is an end view with the housing head removed and part of the shaft in section looking in the direction of the arrow in Fig. 1.

The housing 11 is provided with an oil drain 56 in its bottom and an oil supply port 57 in its upper portion or top, the oil level being shown in Figs. 1 and 2. The oil is conveyed to the several bearings by the rings 58 placed over the shaft 16 and dipping into the oil.

The rotor 33 is provided with flanges 59 at both ends and a longitudinal slot or pocket 60, in which the rotor piston 61 is located.

The rotor piston 61 is composed of the section 62, which is the full width of the rotor, and the two sections 63. (See Fig. 6.) The sections 63 have a combined width slightly less than section 62, the object of which is, that compressed air entering the space 64 between the sections will have a tendency to force them apart and make a fluid tight joint between them and the heads 36 of the compression chamber. The idea of making the rotor piston out of sections, and providing between the sections, a space for compressed air, so that they may be adjusted by means of air pressure, I regard as another special feature of my improvement.

Figure 6:
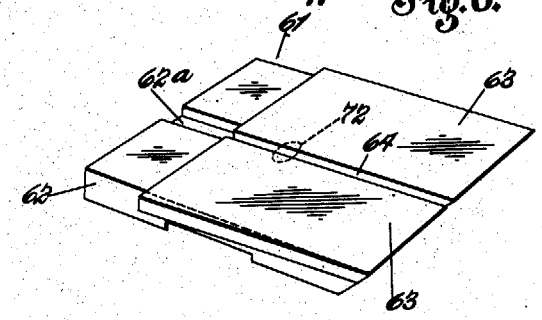
Fig. 6 is a perspective view of the rotor piston.

By reference to Figs. 6, 8 and 11 it will be observed that the section 62 is slightly tapered, and has its forward edges slightly curved, the object of which is to prevent the same from wedging or binding in its movement. It will be observed, however, that the rounded edges are overlapped by the sections 63. The section 62 of the piston is formed with a port 62ª which admits oil and pressure from the compression chamber into the space behind or beyond the rear edge of the piston. This pressure that is admitted behind the piston blade cooperates with centrifugal energy in the operation of the machine to hold the outer edge of the blade in continuous contact with the inner periphery of the cylinder.

After the air has been compressed in the chamber 34, it passes through poppet valves 65, thence through port 66, thence through port 67 of shaft 16; ports 66 and valves 65 being located in the rotor forward and close to rotor piston 61. After leaving the shaft 16, through hole 67, it passes into cap 19, thence through pipe 21 into cooling coil 22, returning therefrom through pipe 24 into housing 11 at point 23, and finally through pipe 22′ to a suitable storage tank or reservoir. It will be noted that suction bore 30 and discharge port 67 of shaft 16 are separated by a wall 68.

The pressure of the spring 40 is exerted on the lug 69 formed on one side of the eccentric member or casing 37, and has a tendency to turn the same.

Figure 7:
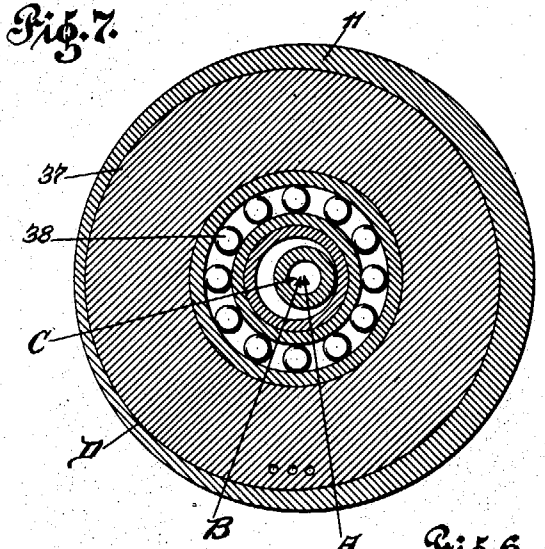
Fig. 7 is a diagrammatic view showing the manner of eccentrically mounting the cylinder.

By referring to Fig. 7, point A represents the center of rotation for the shaft 16 and rotor 33, as well as the center from which the outer circumference of the housing 11 is struck, the point B the center around which the compression cylinder 35 revolves, and point C the center from which the bearings D for the eccentric member 37 are struck. (See Figs. 1 and 3.)

It will be observed from the foregoing description that the compression space or chamber 34 is formed by the rotating cylinder 35, the floating heads 36 and the rotor 33. On the inside of each floating head 36 there is a space or chamber 69′ formed in the ends of the rotor, by means of which the pressure on each side of the floating heads is partially equalized. (See Figs. 1 and 4.) In the rotor pocket 60 (see Fig. 8) there is also a small chamber or space 70 for compressed air, by means of which the pressure on each side of the rotor piston 61 is partially equalized.

As previously pointed out, in operation, when the compressor has started, the springs 49 will maintain a fluid tight joint between the rotor and floating heads 36, but when pressure has been accumulated in the housing 11, the fluid pressure therein will be sufficient to maintain a fluid tight joint without the springs, between the ends of the rotor and the floating heads 36. In practical operation, the fluid pressure accumulated within the housing 11, acting on the floating heads 36, will maintain a fluid tight joint between said heads and the ends of the rotor.

The idea of maintaining the heads 36 in fluid tight contact with the ends of the rotor, by means of fluid pressure generated within the compressor and accumulated within the housing 11 of the compressor, together with the pressure equalization of the heads, as previously pointed out, is one of the characteristic features of my improvement.

As previously mentioned, the rotor 33 is held in fluid tight contact with the cylinder 35 by means of the spring 40 acting on the eccentric member or casing 37. The eccentric member or casing 37 is laterally adjustable relative to the rotor 33 and the shaft 16, and consequently the compression cylinder 35, being mounted or carried on said member 37, is therefore laterally adjustable relative to said shaft and the rotor mounted thereon.

By the rotation of the eccentric member or casing 37 through the agency of spring 40, or by any other instrumentality, the compression cylinder 35 is adjusted laterally against the rotor. This adjustment is automatic in its action, and compensates for any wear between the compression cylinder and the rotor. This lateral adjustability of the compression cylinder, relative to the rotor, constitutes another characteristic feature of my improvement.

My compressor is operated preferably by direct connection to a motor shaft 44 by any flexible coupling. The rotation of the motor produces rotation of shaft 16 and rotor 33, which is rigidly mounted on said shaft. During this operation, rotor piston 61 sweeps through compression chamber 34, causing air to be taken into said chamber 34 through the bore 30 of the hollow shaft 16, through port 32 into said chamber at the rear or behind piston 61. At the same time, air in front of the piston in chamber 34 is being compressed, and is ultimately forced out through discharge valve 65, thence through port 66 into hole 67 of shaft 16, thence into cap 19 and through pipe 21 into the cooling coil 22, and then returns through pipe 24 into the chamber of the housing 11 at point 23, and thence through pipe 22' to a suitable air tank or receiver. It will be thus seen that the compressed air passing through the cooler 22, gives up the heat of compression, and in its return passage through the housing surrounding the cylinder 35, absorbs the heat of compression from the cylinder walls.

During this operation, cylinder 35, being in frictional contact with the revolving rotor at point 39, revolves therewith on cylinder bearings 38. This causes a low surface speed between the elements forming the compression cylinder and the elements of the rotor, with consequent reduction of friction between the moving surfaces thereof.

It will be understood that during the compression, the position of the compression chamber 34 is not changed, notwithstanding the fact that all the surfaces thereof are moving, and the rotor piston 61 sweeps through this chamber just as it would if the cylinder were stationary. The rotor piston 61, during this operation, under the influence of centrifugal force, is continually held out against the wall of the cylinder 35, and is forced back into the piston pocket 60 as it approaches the rolling contact 39. It will be observed, as previously mentioned, that the compression chamber is formed between the walls of cylinder 35, rotor 33 and floating heads 36.

A fluid tight joint is maintained at point 39 by the action of spring 40, which tends to turn eccentric casing 37 in its bearings D in housing 11. This action, by virtue of the eccentricity of this member with relation to cylinder 35, tends to move the cylinder laterally against the rotor 33, due to the fact that the thin side of eccentric member 37 or the portion adjacent to the spring abutment is adjacent to point 39. (See Figs. 3 and 7.)

Fluid tight joints are also maintained at the ends of rotor 33 by floating heads 36, which are initially held in contact with flanges 59 of the rotor by the action of springs 49. It will be understood, as previously mentioned, that springs 49 exert, at the beginning of compression, only slight pressure, and when air has been compressed in the chamber of housing 11 to an appreciable amount, it acts in conjunction with springs 49 to maintain this fluid tight contact between heads 36 and flanges 59 of rotor 33.

It will be understood that the action of these forces upon the floating heads 36 tends to produce a clamping effect upon the rotor 33, and this would be very great if some means were not provided for reducing this action to a minimum. This is accomplished by reducing the unbalanced area against which the pressure acts, as shown more clearly in Fig. 4.

Figure 4:
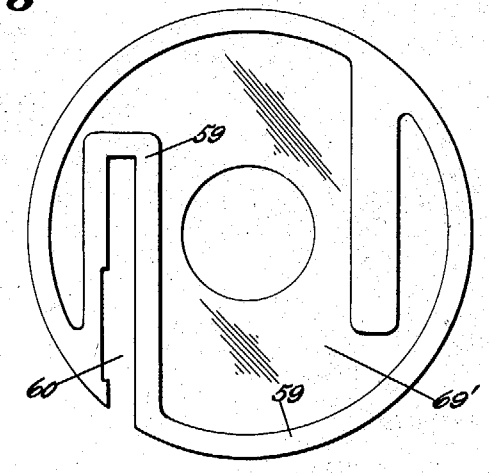
Fig. 4 is an enlarged end view of the rotor.
Figure 5:
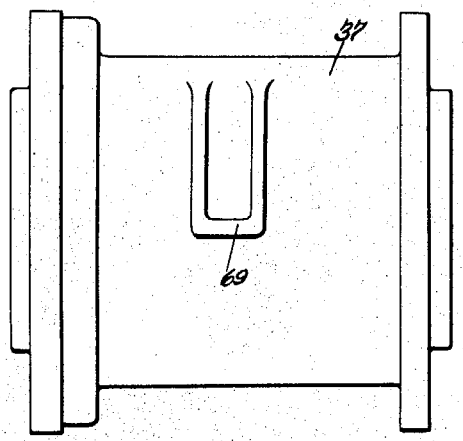
Fig. 5 is a side view of the eccentric member or casing supporting the compression cylinder.

By referring to Fig. 4, it will be noted that the metal at the ends of rotor 33 is removed by routing, to form the chambers 69′, and leaving a comparatively narrow flange 59 around the periphery of the rotor and the rotor piston slot or pocket 60. By forming these chambers or cavities 69′, by the removal of metal from the ends of rotor, air is permitted, under the pressure existing in housing 11, to enter said cavities or chambers 69′ between the ends of rotor 33 and heads 36, thereby partially equalizing the pressure acting upon these heads, and reducing the friction load accordingly.

As previously pointed out, the rotor piston 61 is forced outwardly against the cylinder wall 35 by centrifugal action and the pressure that is admitted to the rear of said piston as above described, and inwardly by virtue of the eccentric mounting of the compression cylinder relative to the rotor. In operation, the pressure in front of the rotor piston, it will be understood, is far in excess of that in the rear, which has a tendency to prevent the operation of the rotor piston in its pocket by virtue of the friction produced between the rotor piston and the rear wall of the piston pocket. In order to overcome this, I have formed in the rear of the rotor piston, a pocket or chamber 70, (see Fig. 8) partially formed in the rear wall of the pocket, and partially formed in the rear face of the rotor piston. In operation, compressed air enters this chamber in the rear of the rotor piston through port 71 of the rotor and port 72 of the rotor piston, thus tending to equalize the pressure on the rotor piston. This method of equalizing the pressure on the front and rear faces of the rotor piston constitutes another important feature of my improvement.

Figure 3:
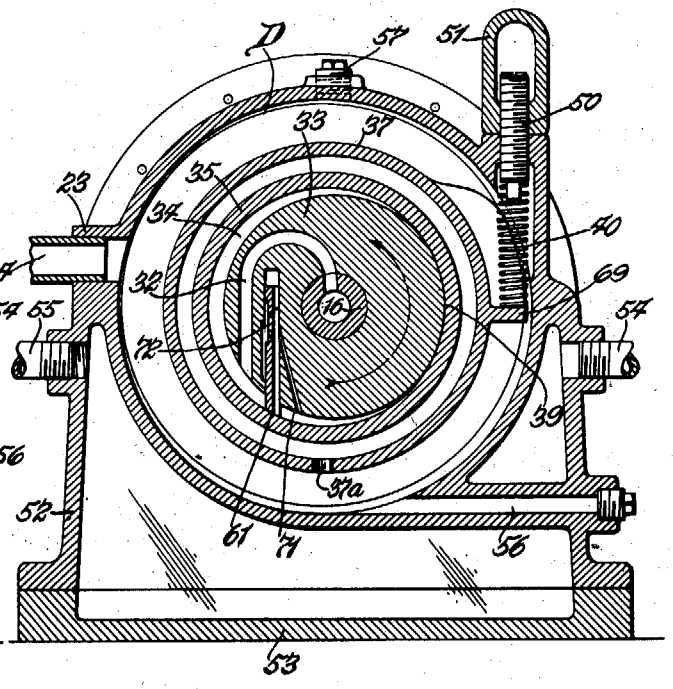
Fig. 3 is a cross section on the line 3—3 of Fig. 1.

As clearly shown in Figs. 1 and 3 of the drawings, the member 37 is cylindrical in cross section and is formed with a hole 37ᵃ through which oil is free to pass into contact with the rotary cylinder 35 and associated parts. This cylinder 35 and associated parts, during the operation of the compressor, pick up the oil from the member 37 and throw it over the walls of this member, thus tending to reduce the level of the oil therein with the result that more oil from the housing flows through the hole 37ᵃ. The drainage of oil from the member 37 back to the housing is through the cylinder bearing openings and flows copiously over the openings through the trunnions of these bearings and on to the rotor shaft passing through these openings and, due to the reduction in diameter of the shaft where rings 58 are placed, is thrown by centrifugal force into the bore of the bearing trunnions and thence into the chambers in the heads 36 and into the chamber between these heads and the ends of the rotor. The rings 58 on the shaft also tend to supply lubricating oil to said parts and to the shaft bearings 41. Thus, these moving parts, comprising the cylinder 35, which operates in the oil, are thoroughly lubricated automatically and as an incident to the operation of the compressor. Further, this oil is subjected to the pressure of the compressed fluid in the housing and is caused to form a seal for the compressor to prevent leakage of the fluid into the compressor.

It will be observed from Fig. 1 that there is an unbalanced pressure area on the heads 36. This unbalanced pressure is caused by the flanges 59 of the rotor contacting with these heads on their inner faces, so that under normal operation there will always be a slightly greater pressure exerted on the heads in a direction toward the rotor, than an outward pressure. Should any sudden rise of pressure, in excess of the inward pressure, be exerted in the compression chamber, the floating heads will move outward and open up a gap between the heads 36 and flanges 59 and relieve the excess pressure from the compression chamber by permitting it to escape through this gap into the cylinder to the rear of the piston, and also through the central openings formed in the cylinder heads into the housing 11. As soon as this excess pressure has been relieved and equalized on both sides of the floating heads 36, they are then forced inward and again seal the compression chamber.

Having fully described my invention, what I claim is:

1. An air compressor comprising a housing, a shaft concentrically mounted therein, a casing eccentrically mounted in said housing, means for yieldingly adjusting said casing, a rotating cylinder provided with floating heads mounted in said casing, a rotor provided with inlet and valved outlet ports eccentrically mounted in said rotating cylinder and a rotor piston mounted in said rotor in advance of the inlet ports in the rotor, the said rotor, piston, cylinder and floating heads forming a compression chamber, the said floating heads being held in fluid tight contact with the ends of the rotor by fluid pressure generated by the compressor, and confined within the housing.

2. An air compressor comprising an automatically laterally adjustable rotating cylinder, floating heads mounted wholly within the cylinder and unrestrained from inward movement thereby, a rotor provided with peripheral flanges and with inlet ports and valved outlet ports eccentrically mounted within said cylinder, said floating heads being held in fluid tight contact with the flanges of the rotor both by spring and by fluid pressure generated by the compressor.

3. In a rotary air compressor, an adjustable cylinder, heads independently movable relative to said cylinder, a rotor eccentrically mounted in said cylinder, a centrifugally operated piston blade tangentially mounted in said rotor, and a housing acting as a receiver for the air compressed by the compressor surrounding said cylinder.

4. In a rotary air compressor, a compression cylinder having at each end a fixed and a floating head, a rotor eccentrically mounted therein, a rotor piston carried tangentially mounted in said rotor, a chamber formed in each end of the rotor for equalizing the pressure on the floating heads, a chamber formed in the rear of the rotor piston for equalizing the pressure on the faces of said piston, and automatic means for adjusting the compression cylinder to and from the rotor.

5. In a rotary air compressor, a rotating compression cylinder having fixed and floating heads, a rotor eccentrically mounted within said cylinder, said rotor provided in each end with a chamber for equalizing the pressure on the floating heads, a rotor piston, a chamber formed in the rear of said piston for equalizing the pressure on the faces of said piston, and elastic means for holding said floating heads in fluid tight contact on the ends of the rotor.

6. In a rotary air compressor, a rotating compression cylinder, a rotor having a chamber in each end eccentrically mounted in said rotating cylinder, automatic means for adjusting said compression cylinder towards the rotor and at right angles to the axis of rotation of said rotor, movable heads carried by said cylinder and contacting with the ends of said rotor, and elastic means for holding said heads in fluid tight contact with the ends of the rotor.

7. In a machine of the class described, the combination of a barrel to receive a fluid, and having heads, a rotary drum eccentrically mounted in said barrel, a single blade guided to slide in and out in said drum as the drum rotates, and including a pair of packing plates within said barrel for engaging the ends of said drum, said drum having a pressure equalizing chamber on the rear side of said blade remote from the working side of said blade, and means for maintaining communication between said equalizing chamber and the working chamber of the barrel to equalize the lateral forces exerted on the opposite sides of said blade.

8. In a rotary air compressor, a housing, a rotating cylinder mounted in said housing, floating heads for said cylinder, a rotor, an equalizing chamber between the rotor and floating heads for equalizing the pressure on said heads, a piston blade carried by said rotor, and means for maintaining communication between the equalizing chamber located between the rotor and floating heads and the housing.

9. An air compressor comprising a housing, a hollow shaft mounted therein, a rotating compression cylinder mounted in said housing, floating heads for said cylinder, a rotor mounted in said cylinder, automatic means for adjusting said cylinder relative to said rotor, a rotor piston mounted in said rotor, and a cooling device communicating with the compression chamber and the housing whereby the air from the compression chamber is conducted to and through the cooling device before coming in contact with the external walls of the cylinder, thereby preventing the cylinder from rotating in the hot gases generated by the compressor.

10. In a compressor of the character described, a casing, a rotary piston, a rotary cylinder therefor mounted eccentrically thereto and having a portion of its inner wall engaging a portion of the peripheral wall of the piston, the remaining portions of said walls being spaced apart to form a compressing chamber between them, supporting members carried by the cylinder at the opposite ends thereof, and means within the cylinder and interposed between said members and the adjacent ends of the cylinder and piston and operating under a differential of gas pressure in the casing for closing the ends of the compressing chamber and effecting gas tight joints with the ends of the piston and with the interior of the cylinder respectively.

11. In a compressor of the kind described, a rotary piston, a cylinder therefor mounted rotatably and eccentrically thereto and actuated thereby, terminal heads carried by the cylinder, trunnions on the heads, and a rotary wedge ring spanning the cylinder and cooperating with the trunnions for controlling the eccentricity between the rotation axes of the cylinder and piston.

12. In a compressor of the character described, a rotary piston, a cylinder therefor mounted rotatably and eccentrically thereto, and rotated thereby, terminal heads carried by the cylinder, trunnions on the heads, a drive shaft for the piston passing freely through the trunnions of the cylinder heads, bearings for the shaft and for the trunnions of the cylinder heads, and a rotary wedge ring spanning the cylinder and cooperating with the trunnions thereof for maintaining proper engagement between the cylinder and piston.

13. In a compressor of the character described, a rotary piston, a cylinder therefor mounted rotatably and eccentrically thereto and rotated thereby, terminal heads carried by the cylinder, trunnions on the heads, a drive shaft for the piston passing freely through the aforesaid trunnions, a casing, bearings in the casing for the support of the shaft, annular rings each provided with a race-way for anti-friction bearing bodies supporting the trunnions of the cylinder heads, and a rotary wedge ring spanning the cylinder and surrounding the annular rings and operating to maintain proper contact between the inner wall of the cylinder and the periphery of the piston.

14. In a rotary machine, the combination of a rotary piston, a rotatable cylinder comprising a cylindrical shell engaging the face of said piston and rotated thereby, said cylinder having heads, and mounted to rotate about an axis eccentric to the axis of rotation of the piston, adjustable members constituting bearings on which said cylinder rotates, and means for yieldingly forcing said adjustable members in a direction to maintain said shell in contact with the face of the piston.

15. In a rotary compressor, the combination of a casing, a rotatable piston, a rotatable cylinder having heads and a cylindrical shell engaging the face of the piston and rotated thereby, eccentric rings mounted on said casing and supporting said cylinder to rotate on an axis of rotation eccentric to the axis of rotation of the piston, and means tending to rotate said eccentric rings in a direction to maintain the shell in contact with the face of the piston.

16. In a rotary compressor, the combination of a cylinder mounted to rotate, a drum eccentrically mounted therein, engaging the wall of the cylinder, said cylinder and drum cooperating to form a compression chamber, means for admitting a fluid to said compression chamber, floating heads rotating with the drum and cylinder, disposed against the ends of the drum and constituting the end walls of the compression chamber, said compressor having receiving chambers on the outer sides of said floating heads for receiving the fluid under pressure, the fluid pressure in said receiving chambers operating to hold the floating heads yieldingly against the ends of the drum, whereby the floating heads may move outwardly to relieve sudden excessive pressure within the cylinder.

17. In a rotary compressor, the combination of a cylinder mounted to rotate in a casing, a rotor eccentrically mounted therein engaging the wall of the cylinder, a shaft extending concentrically through said rotor, said cylinder and rotor cooperating to form a compression chamber, means for admitting a fluid to said compression chamber, floating heads rotating relatively with the rotor and cylinder disposed against the ends of the rotor and constituting the end walls of the compression chamber, means for maintaining air under pressure against the outer faces of said floating heads for holding said heads yieldingly against the ends of the rotor, whereby the floating heads may move outwardly to relieve sudden excessive pressure within the cylinder.

18. In a rotary compressor, the combination of a casing, a rotating cylinder having heads for closing the ends thereof mounted in said casing, a rotary piston eccentrically mounted in said rotating cylinder, a rotating shaft extending axially through said rotor, a piston blade mounted in said rotary piston, a pressure equalizing chamber in the rear of the blade, and means for admitting fluid pressure from the front or compression side of said blade into said equalizing chamber for equalizing the pressure on opposite sides of said blade to reduce friction tending to restrict the free movement of said blade.

19. In a rotary compressor, the combination of a housing arranged to hold pressure generated by the compressor, a rotating cylinder, a rotor eccentrically mounted in said rotating cylinder, means for rotating said rotor, a piston mounted in said rotor, said rotating cylinder and rotor being mounted in the housing, movable heads for closing the ends of said cylinder acted on by gas pressure from said housing.

20. In a rotary compressor, a housing, a shaft revolvable on anti-friction bearings mounted therein, a rotor mounted on said shaft, a piston mounted in said rotor, a rotating cylinder provided with floating heads adjustably mounted on anti-friction bearings within said housing, the said rotor, piston, cylinder and floating heads forming a compression chamber, an oil reservoir, a cooling device in communication with the compression chamber, means for taking the oil from the oil reservoir for disposing the oil over the moving surfaces of the elements of the compression chamber and into the same, said cooling device acting to condense the oil vapor discharged from the compressor and returning it to the oil reservoir.

21. In an air compressor, a housing arranged to receive and confine the fluid compressed under the pressure developed by the compressor, a rotary compressor within said housing enveloped in said fluid, said housing containing a body of lubricating oil to lubricate the parts thereof, said oil and fluid under pressure forming a separate oil seal at each end of the compressor to prevent leakage of the fluid under pressure into said compressor.

22. In a rotary air compressor, a housing, a rotor piston mounted in said housing, a revolvable cylinder surrounding said piston, provided with axially movable heads for and eccentric to said piston, means for holding said cylinder in position with relation to said rotor so that a rolling contact between said piston and cylinder is maintained, said housing being arranged to hold compressed fluid under the pressure of the compressor for the purposes set forth.

23. In a fluid compressor, the combination with a housing, of a cylinder rotatably mounted therein, a rotor piston eccentrically mounted in the cylinder, means for rotating said rotor, said cylinder and rotor piston having a rolling contact and cooperating to form a compression chamber, relief heads for said cylinder constituting the end walls of said compression chamber, and means for admitting fluid pressure from the compression chamber into the housing to act against the outer sides of the relief heads to hold the same in position against the rotor during the operation of the compressor.

24. In a rotary compressor, a rotor, a cylinder surrounding the rotor, a blade slot in said rotor and a piston blade guided to slide in and out of said slot, a pressure chamber in the rear of said blade, means for admitting fluid pressure into the chamber, said pressure chamber being formed partly in the rotor and partly in the said piston blade whereby the pressure area of said blade adjacent said pressure chamber is increased as the blade moves inward in said blade slot.

25. A rotary compressor comprising a cylinder, a rotor mounted within and eccentrically thereto, a compression chamber, a housing receiving and confining the compressed fluid under compression and containing a body of lubricating oil under the pressure of the compressed fluid, a one way passage for delivering compressed fluid from the compression chamber into said housing, said rotor having portions thereof cut away at its ends, means cooperating with said cut away portions of the rotor to form separate oil reservoirs interiorly of the length of said cylinder, open communications from said housing to said reservoirs for admitting oil thereto and for maintaining the same under the pressure of the compressed fluid in the housing whereby the oil in said reservoirs, together with said one way passage, acts to prevent leakage of compressed fluid from said housing into said compression chamber.

26. A rotary compressor comprising a cylinder, a rotor mounted within and eccentrically thereto, a compression chamber intermediate said cylinder and said rotor, a housing receiving and confining the compressed fluid under compression and containing a body of lubricating oil under the pressure of the compressed fluid, a one way passage for delivering compressed fluid from the compression chamber into said housing, heads forming end walls for said compression chamber, said heads and the ends of said rotor cooperating to form separate reservoirs at each end of said rotor interiorly of the length of said cylinder, open communications from said housing to said reservoirs for admitting oil thereto and for maintaining the same under the pressure of the compressed fluid in the housing whereby the oil in said reservoirs, together with said one way passage acts to prevent leakage of compressed fluid from said housing into said compression chamber.

27. A rotary compressor comprising a cylinder, a rotor mounted within and eccentrically to said cylinder for rotation therein, a compression chamber intermediate said cylinder and said rotor extending longitudinally of said cylinder, a reciprocable piston blade cooperating with said cylinder and said rotor to effect compression of fluid when said rotor is rotated relative to said cylinder, a housing receiving and confining the compressed fluid under compression and containing a body of lubricating oil under the pressure of the compressed fluid confined in said housing, a one way valve means for permitting passage of compressed fluid from said compression chamber to said housing, heads forming end walls for said compression chamber, said heads and the ends of said rotor cooperating to form walls of separate annular chambers at each end of the rotor interiorly of the length of the cylinder, open communications from said housing to said annular chambers for admitting oil thereto and for maintaining the same under the pressure of the compressed fluid in the housing whereby the oil in said annular chambers; together with said one way valve means, acts to prevent leakage of compressed fluid from said housing into said compression chamber.

EDWARD WILSON.